US010105287B2

(12) United States Patent
Thomas et al.

(10) Patent No.: US 10,105,287 B2
(45) Date of Patent: Oct. 23, 2018

(54) SYSTEM AND METHOD FOR REMOTELY MONITORING MEDICATION COMPLIANCE USING A PILLBOX WITH A CAMERA

(71) Applicant: Brian P. Thomas, Blaine, MN (US)

(72) Inventors: Brian P. Thomas, Blaine, MN (US); Trevor B Thomas, Blaine, MN (US); William Eugene Falk, Minneapolis, MN (US)

(*) Notice: Subject to any disclaimer, the term of this patent is extended or adjusted under 35 U.S.C. 154(b) by 208 days.

(21) Appl. No.: 15/273,417

(22) Filed: Sep. 22, 2016

(65) Prior Publication Data

US 2017/0085756 A1  Mar. 23, 2017

Related U.S. Application Data

(60) Provisional application No. 62/222,739, filed on Sep. 23, 2015.

(51) Int. Cl.
| | | |
|---|---|---|
| A61J 7/00 | (2006.01) | |
| A61J 7/04 | (2006.01) | |
| B65D 83/04 | (2006.01) | |
| H04N 5/225 | (2006.01) | |

(52) U.S. Cl.
CPC .......... *A61J 7/0076* (2013.01); *A61J 7/0418* (2015.05); *A61J 7/0481* (2013.01); *B65D 83/04* (2013.01); *H04N 5/2251* (2013.01); *H04N 5/2256* (2013.01); *A61J 2200/30* (2013.01); *A61J 2205/20* (2013.01)

(58) Field of Classification Search
CPC ... H04N 5/2251; H04N 5/2256; A61J 7/0084; A61J 7/0076; A61J 7/02; A61J 7/04; A61J 7/0409; A61J 7/0418; A61J 7/0427; A61J 1/03; A61J 7/481; B65D 83/04
USPC .................................. 206/528, 530, 539, 540
See application file for complete search history.

(56) References Cited

U.S. PATENT DOCUMENTS

| | | | | |
|---|---|---|---|---|
| 6,771,174 B2* | 8/2004 | Broas | .................... | A61J 7/0481 340/573.1 |
| 8,060,249 B2* | 11/2011 | Bear | ..................... | A61J 7/0481 700/232 |
| 8,068,931 B2* | 11/2011 | Tran | ..................... | G06F 19/3462 206/534 |
| 8,193,918 B1* | 6/2012 | Shavelsky | ................. | A61J 7/04 340/309.16 |
| 8,253,561 B2* | 8/2012 | Bowers | ..................... | A61J 1/03 340/309 |

(Continued)

*Primary Examiner* — John Villecco (57) ABSTRACT

A system and method for monitoring compliance with medications is disclosed. The system includes a pillbox, a control system that is spaced away from the pillbox, an information transfer system, and a monitoring device. The pillbox includes a lid, a housing base, a camera secured to the pillbox to allow the camera to take pictures for the housing base, and a sound device secured to the housing base. The control system is in communicable connection with the pillbox and the information transfer system. The information transfer system is in communicable connection with the monitoring device. The camera can take pictures or videos and transfer this information to a monitoring device to check compliance. The system configuration and control is moved away from the pillbox and the configuration and control is given to a remote user with a monitoring device.

19 Claims, 7 Drawing Sheets

(56) References Cited

U.S. PATENT DOCUMENTS

| | | | | |
|---|---|---|---|---|
| 8,583,281 B2* | 11/2013 | Bear | A61J 7/0481 | 700/232 |
| 8,700,212 B1* | 4/2014 | Bruno | A61J 7/0069 | 206/534 |
| 8,725,291 B2* | 5/2014 | Czaja | G06F 19/3462 | 700/237 |
| 8,744,620 B2* | 6/2014 | Shavelsky | A61J 7/04 | 700/237 |
| 8,773,261 B2* | 7/2014 | Bowers | A61J 1/03 | 340/309 |
| 9,014,427 B2* | 4/2015 | Bear | A61J 7/0076 | 348/135 |
| 9,066,849 B2* | 6/2015 | Fung | A61J 1/03 | |
| 9,211,233 B2* | 12/2015 | Shavelsky | G06F 19/00 | |
| 9,235,690 B2* | 1/2016 | Bear | A61J 7/0481 | |
| 9,313,464 B2* | 4/2016 | Pellerin | G06F 19/3462 | |
| 9,770,390 B2* | 9/2017 | Aggarwal | A61J 7/0069 | |
| 2008/0119958 A1* | 5/2008 | Bear | A61J 7/0481 | 700/244 |
| 2010/0314282 A1* | 12/2010 | Bowers | A61J 1/03 | 206/534 |
| 2010/0332023 A1* | 12/2010 | Tripathi | A61J 7/0481 | 700/231 |
| 2012/0029693 A1* | 2/2012 | Bear | A61J 7/0481 | 700/244 |
| 2012/0165975 A1* | 6/2012 | Yi | A61B 5/4833 | 700/237 |
| 2013/0002795 A1* | 1/2013 | Shavelsky | G06F 19/00 | 348/14.01 |
| 2013/0024022 A1* | 1/2013 | Bowers | A61J 1/03 | 700/236 |
| 2013/0030566 A1* | 1/2013 | Shavelsky | A61J 7/04 | 700/244 |
| 2013/0169798 A1* | 7/2013 | Pellerin | G06F 19/3462 | 348/135 |
| 2013/0195326 A1* | 8/2013 | Bear | A61J 7/0076 | 382/128 |
| 2013/0238118 A1* | 9/2013 | Haas | G07F 11/00 | 700/231 |
| 2014/0052468 A1* | 2/2014 | Burrows | G06F 19/3456 | 705/2 |
| 2014/0188272 A1* | 7/2014 | Bear | A61J 7/0481 | 700/244 |
| 2015/0283036 A1* | 10/2015 | Aggarwal | A61J 7/04 | 206/534 |
| 2016/0136054 A1* | 5/2016 | Bunker | A61J 7/0084 | 340/573.1 |
| 2016/0143807 A1* | 5/2016 | Ika | A61J 1/03 | 206/216 |
| 2016/0354283 A1* | 12/2016 | Cho | A61J 7/02 | |
| 2017/0258686 A1* | 9/2017 | Bunker | A61J 7/0436 | |
| 2017/0296432 A1* | 10/2017 | Ika | A61J 1/03 | |

* cited by examiner

SYSTEM AND METHOD FOR REMOTELY MONITORING MEDICATION COMPLIANCE USING A PILLBOX WITH A CAMERA

FIELD

This disclosure relates generally to pillboxes. More specifically, the disclosure relates to a system and method of remotely monitoring compliance with medications using a pillbox with a camera.

BACKGROUND

With the growing aging population, more and more elderly people are taking prescribed medications for different health conditions. Many elderly people use a conventional pillbox to assist them in taking medications. However, it can be frustrating and confusing for the elderly people to manage the medication taking process and to comply with the medication taking requirements, especially for those elderly people who live by themselves.

SUMMARY

To address the above issues, a system and method of remotely monitoring compliance with medications using a pillbox with a camera is disclosed. The system and method can help people to be in compliance with medications by providing reminders in various forms such as lights in different colors, sounds, and/or the like. The system and method can also help people to be in compliance with medications by providing notifications to user(s) who might be away from people who are supposed to take medications. The user(s) can contact people who are supposed to take medications when the user(s) receive non-compliance notification from the system.

In some embodiments, the system can include a pillbox, a control system that is secured to the pillbox, an information transfer system, and a monitoring device. The control system can be in communicable connection with the information transfer system. The information transfer system can be in communicable connection with the monitoring device. The pillbox can include a lid, and the lid has an inside surface, an outside surface, and a lid switch. The pillbox also can have a housing base, the housing base can have at least one row and seven columns, and the housing base is divided into at least one compartment by the at least one row and the seven columns. Each of the at least one compartment can include a light to illuminate the at least one compartment with at least one color. The pillbox can further include a camera that is disposed at an apex of the inside surface of the lid to allow the camera to take pictures for the at least one compartment. The pillbox can also include a sound device secured to the housing base. The housing base has a top layer and a bottom layer, and the lid can be attached to a side of the top layer of the housing base. The control system can be in communicable connection with the camera, the light of each of the at least one compartment, the lid switch, and/or the sound device.

In some embodiments, the control system can control the camera to take still pictures and/or videos and can transfer the pictures and/or videos information through the information transfer system to the monitoring device for monitoring compliance with medications. In some embodiments, the information transfer system can be Internet. In some embodiments, the monitoring device can be a mobile device or other device connected to the Internet.

In some embodiments, a system configuration and control can be moved away from the pillbox or from the patient using the pillbox. In some embodiments, the system configuration and control can be given to a remote user with a mobile device or other Internet connected device.

BRIEF DESCRIPTION OF THE DRAWINGS

References are made to the accompanying drawings that form a part of this disclosure and which illustrate embodiments in which the systems and methods described in this specification can be practiced.

Like reference numbers represent like parts throughout.

DETAILED DESCRIPTION

This disclosure relates generally to pillboxes. More specifically, the disclosure relates to a system and method of remotely monitoring compliance with medications using a pillbox with a camera.

In some embodiments, the system can include a pillbox, a control system that is secured to the pillbox, an information transfer system, and a monitoring device.

In some embodiments, the pillbox can include a lid, the lid has an inside surface, an outside surface, and a lid switch. In some embodiments, the lid can be pyramid-shaped, vaulted, pyramid-shaped with a top pyramid being removed, and/or the like. The pillbox can also include a housing base, the housing base has at least one row and seven columns, the housing base is divided into at least one compartment by the at least one row and the seven columns, and each of the at least one compartment can include a light to illuminate the at least one compartment with at least one color. The pillbox can further include a camera disposed at an apex of the inside surface of the lid to allow the camera to take pictures for the at least one compartment. The pillbox can also include a sound device secured to the housing base. It is to be understood that the sound device can be alternatively secured to the lid. It is also to be understood that to allow the camera to take a picture for all compartment and medications within the compartments at one time, the camera would need to be far enough away (from the housing base) with a lens to be able to take a picture of all the compartments.

In some embodiments, the camera can be secured on the housing base. In such embodiments, one or more mirrors can be secured to the inside surface of the lid. The camera can be pointing up at the one or more mirrors. The images of the compartments and medications within the compartments can be reflected off the mirrored lid and be captured by the camera.

In some embodiments, the housing base has a top layer and a bottom layer, and the lid can be attached to a side of the top layer of the housing base.

In some embodiments, the control system can be in communicable connection with the camera, the lid switch, and the sound device of the pillbox. The control system can be in communicable connection with the light of the at least one compartment. The information transfer system can be in communicable connection with the control system and the monitoring device.

In some embodiments, when the lid switch is turned to an open position, a signal can be sent from the lid switch to the control system to notify the control system that the pillbox is open. When the lid switch is turned to a closed position, a signal can be sent from the lid switch to the control system to notify the control system that the pillbox is closed.

Figure 1A:
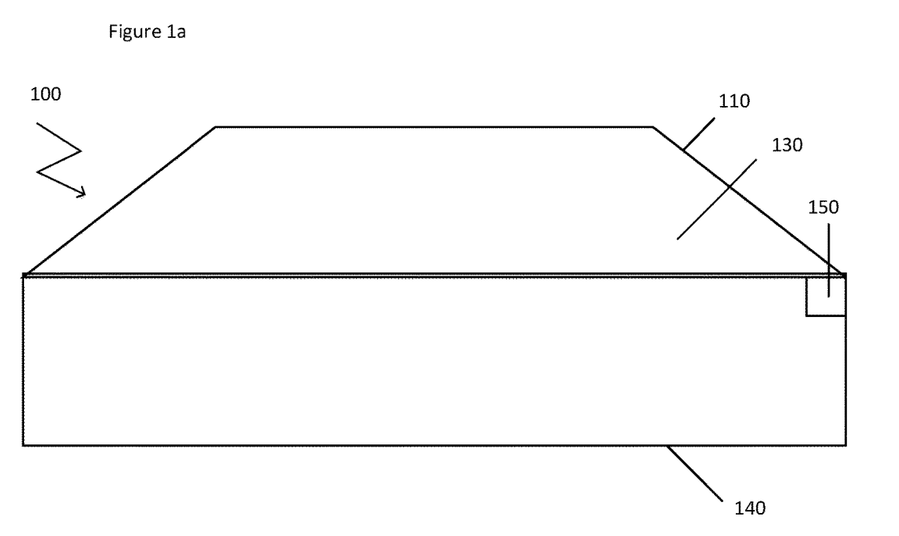
FIG. 1a is a front view of a pillbox, according to some embodiments.

FIG. 1a is a front view of a pillbox, according to some embodiments. The pillbox 100 generally includes a lid 110. The lid has an inside surface 120 and an outside surface 130. The pillbox can also include a housing base 140. The lid can include a lid switch 150. In such embodiment, FIG. 1 shows that the lid 110 is closed on the housing base 140.

In some embodiments, the pillbox 100 can be made of a transparent or translucent material to allow lights to shine through. In such embodiments, a clear pillbox can help a user see the medications and help with determining compliance.

Figure 1B:
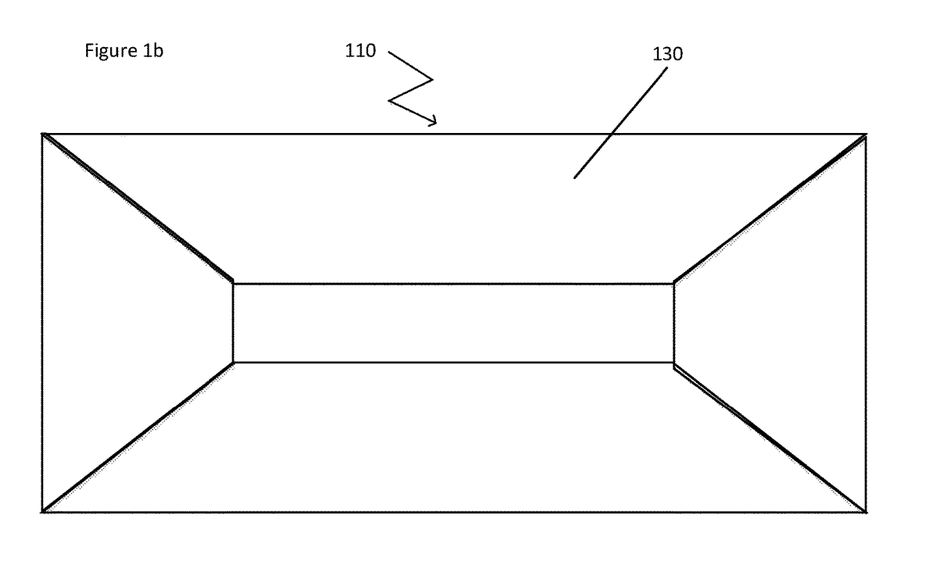
FIG. 1b is a top view of a pillbox, according to some embodiments.

FIG. 1b is a top view of a pillbox, according to some embodiments. The outside surface 130 is shown in FIG. 1b.

Figure 2:
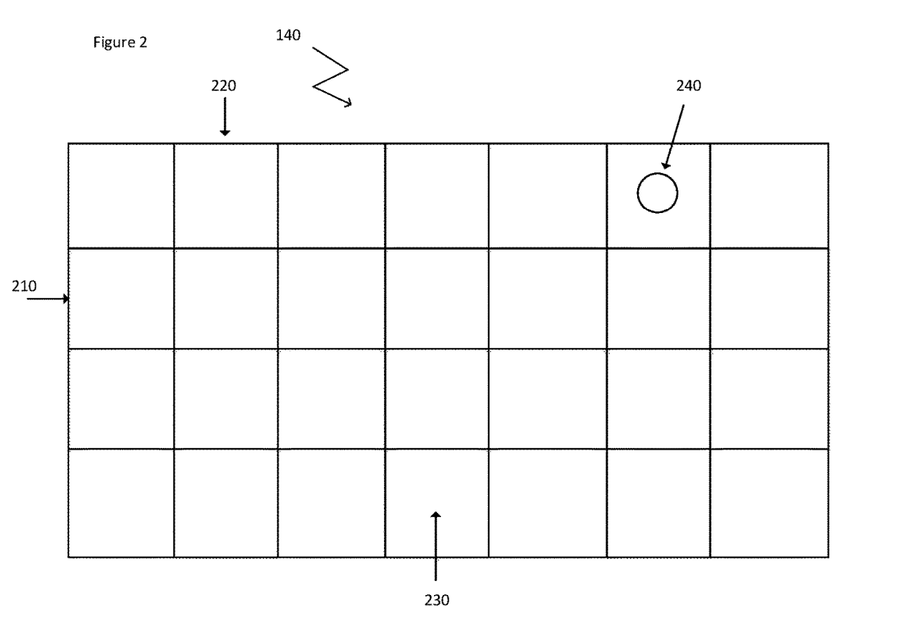
FIG. 2 is a top view of the housing base, according to some embodiments.

FIG. 2 is a top view of the housing base, with the lid removed from the pillbox, according to some embodiments. The housing base 140 can have at least one row 210 and seven columns 220. In some embodiments, the seven columns can represent seven days of a week. The housing base 140 is divided into at least one compartment 230 to store medications by the at least one row 210 and the seven columns 220. Each of the at least one compartment 230 can include a light 240 to illuminate the at least one compartment 230 with at least one color.

In one embodiment, the housing base 140 can have four rows. In such embodiment, the housing base is divided into twenty-eight compartments by the four rows and the seven columns. Each compartment can contain medications for one dose. One dose is the amount of medications for consumption at a fixed interval such as, but not limited to, one day. In such embodiment, the number of compartments can represent roughly the number of days within a month. It is to be understood that one or more rows can be used to correspond to one or more times per day that medications should be taken, for example, morning, noon, evening, and bed time. It is also to be understood that some medications are supposed to be taken with meals, so these four times could correspond to breakfast, lunch, dinner, and bedtime. In such embodiment, the four rows can represent the four times in a day.

It is to be understood that as an alternative, every compartment can be further divided into cells (not shown). In one embodiment, the number of cells within a compartment can be three or four, which can represent the number of times medications have to be taken in one day. In such embodiment, an interval of taking medications in one day can be, for example, morning, noon, evening, and/or bed time. Respectively, each cell can contain medications for a dose for morning, noon, evening, and/or bed time usage.

In another embodiment, the housing base 140 can have six rows. In such embodiment, the housing base 140 is divided into forty-two compartments by the six rows and the seven columns. Each compartment can contain medications for one dose. One dose is the amount of medications for consumption at a fixed interval such as, but not limited to, one day. In such embodiment, the number of compartments can represent the number of days shown for a month in a calendar. In such calendar, a month can have six weeks. For example, a first day of the month can be in a first week and a last day of the month can be in a sixth week.

Figure 4:
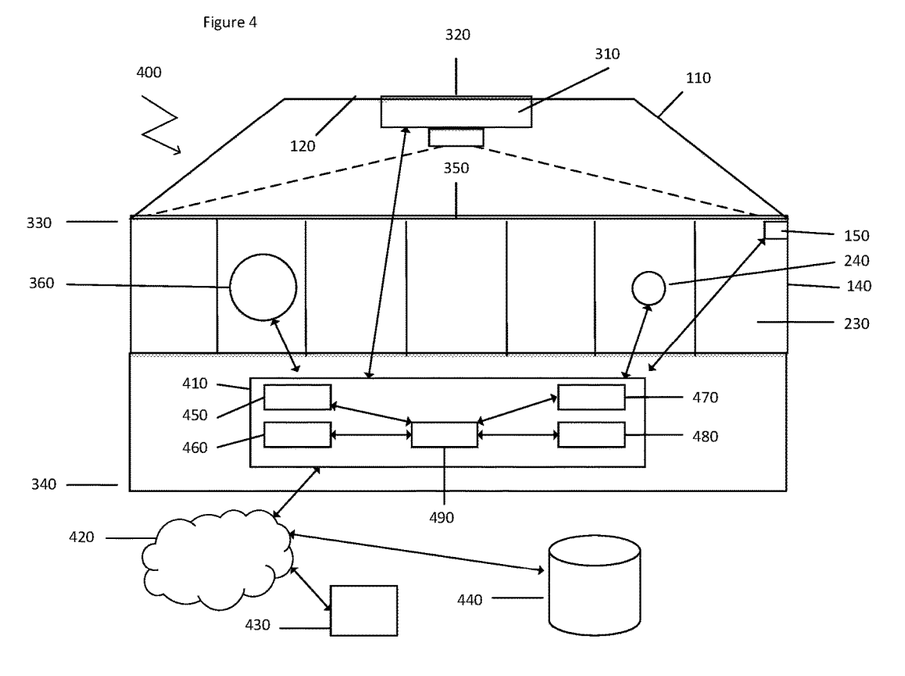
FIG. 4 illustrates a system of monitoring compliance with medications, according to some embodiments.

In some embodiments, the light of each compartment can display lights in different color controlled by the control system. The control system can have a system configuration and control that can be preset by a user. The control system 410 can be a standalone system that has at least one input interface 450, at least one output interface 460, at least one display interface 470, at least one memory 480, and/or a controller 490; the control system can also be controlled by a monitoring device such as a mobile device via an information transfer system or a communication system such as Internet; the control system can be controlled by a monitoring device such as a smart phone with a smart phone application that can program or configure the control system and set reminders. The different color can represent different scenario, such as, but not limited to, indication of a starting compartment to fill medications, indication of an ending compartment to fill medications, indication of current compartment that medications should be taken, indication of on-schedule (medications are ready to be taken) compartment, indication of overdue (medications are overdue to be taken) compartment, indication of compliance and or non-compliance, etc.

Figure 3:
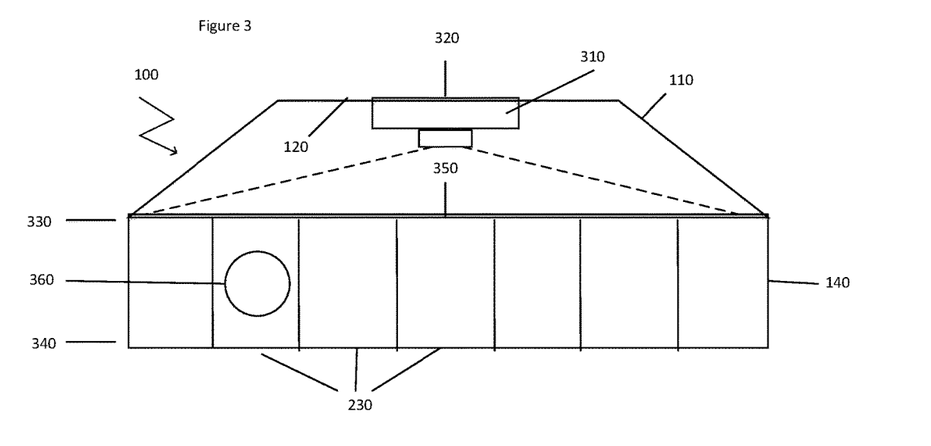
FIG. 3 is a cutaway view of a pillbox, according to some embodiments.

FIG. 3 is a cutaway view of a pillbox when the lid is closed, according to some embodiments. The pillbox 100 includes a camera 310. The camera 310 is disposed at an apex 320 of the inside surface 120 of the lid 110 to allow the camera 310 to take pictures for each of the at least one compartment 230.

In some embodiments, the housing base 140 has a top layer 330 and a bottom layer 340. The lid 110 is attached to a side 350 of the top layer 330 of the housing base 140. In some embodiments, the housing base 140 has a sound device 360 secured to the housing base 140.

It is to be understood that the sound device 360 can alternatively be secured to the lid 110 instead of the housing base 140. In some embodiments, the sound device 360 can emit an audible sound to remind a patient that medications need to be taken. In some embodiments, the sound device 360 can emit different sounds in different scenarios to assist the patient in determining if the medications are, for example on schedule or overdue. In some embodiments, the sound device 360 can emit sounds controlled by the control system. The control system can have a system configuration and control that can be preset by a user. The control system can be a standalone system that has an input device, an output device, a controller, a display device, and/or a memory; the control system can also be controlled by a monitoring device such as a mobile device via an information transfer system or a communication system such as Internet; the control system can be controlled by a monitoring device such as a smart phone with a smart phone application that can program or configure the control system and set reminders. In some embodiments, a user can customize a sound in the sound device 360 with user's own sounds or with user's own voice recordings.

In some embodiments, the camera 310 can take pictures and/or video controlled by the control system. The control system can have a system configuration and control that can be preset by a user. The control system can be a standalone system that has an input device, an output device, a controller, a display device, and/or a memory; the control system can also be controlled by a monitoring device such as a mobile device via an information transfer system or a communication system such as Internet; the control system can be controlled by a monitoring device such as a smart phone with a smart phone application that can program or configure the control system and set reminders. In some embodiments, the camera can be a webcam to communicate with a patient and assist the patient in taking the medications.

FIG. 4 illustrates a system of monitoring compliance with medications, according to some embodiments.

The system 400 can include a pillbox 100, a control system 410 that is secured to the pillbox 100, an information transfer system (or a communication system) 420, and a monitoring device 430. In some embodiments, the control system 410 can be in communicable connection with the camera 310 of the pillbox 100 and the lid switch 150 of the lid 110, the control system 410 can be in communicable connection with the light 240 of the at least one compartment 230, the control system 410 can be in communicable connection with the sound device 360 of the pillbox 100, the control system 410 can be in communicable connection with the information transfer system 420, and the information transfer system 420 can be in communicable connection with the monitoring device 430.

In some embodiments, the control system 410 can be located within the monitoring device 430. In some embodiment, the monitoring device 430 can be a mobile device. In some embodiment, the information transfer system 420 can be Internet.

In some embodiments, the system 400 can include a database 440, and the database 440 can be in communicable connection with the information transfer system 420.

In some embodiments, the database 440 can be located within the control system 410. In some embodiments, the database 440 can be cloud-based or in the internet. In some embodiments, the control system 410 can be secured on the lid 110 of the pillbox 100. In other embodiments, the control system 410 can be secured on the housing base 140 of the pillbox 100.

In some embodiments, the pillbox 100 including the camera 310, the control system 410, and the information transfer system (i.e. the communication system) 420 can be capable of sharing data with external devices such as the mobile device 430.

In some embodiments, the control system 410 can be located within the pillbox 100, the control system 410 includes at least one input interface 450; at least one output interface 460; at least one display interface 470; at least one memory 480; and a controller 490.

In some embodiments, the at least one input interface 450 can be in communicable connection with the monitoring device 430 and the lid switch 150, the at least one output interface 460 can be in communicable connection with the light 240 of each of the at least one compartment 230, the camera 310, and the sound device 360. The controller 490 can be in communicable connection with the at least one input interface 450, the at least one output interface 460; the at least one display interface 470, and the at least one memory 480. In such embodiments, the controller 490 can control and configure the light 240 of each of the at least one compartment 230, the lid switch 150, the camera 310, and the sound device 360 via the at least one output interface 460. The monitoring device 430 can control and configure the control system via the at least one input interface 450. The at least one display interface 470 can connect to a display device such as a touch screen TV. The database 440 can be installed in the at least one memory 480.

In some embodiments, the system 400 can monitor the opening and closing of the pillbox 100, and can send the information through the information transfer system 420, such as, the internet or wireless airways via Internet, Ethernet, Wi-Fi, cellular, or Bluetooth to the mobile device 430, such as, smart phones, tablets, laptops, computers, smart watches, or any mobile device, connected device, or to the database 440.

In some embodiments, the control system 410 can have electronics and software to control the camera 310 that takes still pictures and/or videos and can transfer the pictures and/or videos through the information transfer system 420 such as Internet where the pictures and/or videos can be monitored for compliance by the mobile device 430 such as a mobile device or other device connected to the Internet.

In some embodiments, a system configuration and control can be moved away from the patient using the pillbox 100 and the configuration and control can be given to a remote user with the mobile device.

In some embodiments, the system 400 can take pictures before the pillbox 100 is opened and/or after the pillbox 100 is closed to allow a remote user to monitor compliance with medications.

In some embodiments, the pictures can be sent to the mobile device 430 such as a remote device where a user can visually monitor the pictures and determine compliance.

In some embodiments, the system 400 can perform graphical processing of the pictures to determine a patient's compliance with medication prescription.

In some embodiments, the system 400 can send text and/or email messages when the patient is not compliant as determined by pillbox 100 not being opened over a certain period of time.

In some embodiments, patient compliance can be determined by visually inspecting the pictures, independent of the pillbox 100 being opened or not, and/or independent of any notifications.

In some embodiments, under- and/or over-medication compliance can be monitored by looking at the pictures and records of the timestamps of last few times the pillbox 100 was opened and closed.

In some embodiments, patient compliance can be monitored in cases where the patient opens the pillbox 100 early.

In some embodiments, the camera 310 can take a video of a patient, which could indicate patient compliance and/or non-compliance.

In some embodiments, the system 400 can aid a user in filling the pillbox 100 by lighting lights 240 at the start and end points of the range of cells and/or compartments 230 that need to be filled in the pillbox 100.

In some embodiments, filling of the pillbox 100 with medications can be remotely monitored by taking pictures of the pillbox 100 and sending the pictures to the mobile device 430 such as a remote device where the pictures can be visually verified.

In some embodiments, the system 400 can assist a patient in determining the medications that need to be taken by lighting up the appropriate cell or compartment 230.

In some embodiments, the system 400 can assist a patient in determining if the medications are on schedule or overdue by changing the color of the lighting of the cell or compartment 230.

In some embodiments, the system 400 can remind a patient that medications need to be taken by emitting an audible sound.

In some embodiments, the system 400 can assist a patient in determining if the medications are on schedule or overdue by changing the sounds that are emitted from the sound device 360.

In some embodiments, the system 400 can transmit and store information about the patient compliance in a database 440 and the information can be subsequently analyzed by the mobile device 430 such as mobile devices and/or Internet connected devices.

In some embodiments, the system 400 can monitor non-compliance due to medications that were not taken to the end of the prescription.

In some embodiments, the system 400 can monitor non-compliance due to over medication (for example pain medications) by observing medication taken ahead of schedule.

In some embodiments, the camera 310 can help diagnose medication side effects that cause skin to change colors, for example, Jaundice for skin turning yellow or pulmonary toxicity can cause skin to turn blue.

In some embodiments, the camera 310 can help determine that incorrect medications were loaded into the pillbox 100.

In some embodiments, the camera 310 can help determine that an incomplete dosage of medication was taken.

In some embodiments, the camera 310 can be used as a webcam to communicate with a patient and assist the patient in taking the medications.

In some embodiments, the system 400 can perform graphical processing of the pictures to determine filling of the pillbox with correct medications.

In some embodiments, the number of times to take medications per day is at least one. In some embodiments, the time to take medications in one day can be, for example, 8:00 AM, noon, 4:00 PM, and 8:00 PM. In some embodiments, the time to take medications in one day can be, for example, at different time to correspond to the usual times that a patient eats breakfast, lunch, and dinner, and the patient's bed time.

In some embodiments, a system configuration and control, including the time to take medications in one day, can be programmed by the monitoring device 430, for example, a smart phone application, into the database 440. The control system 410 can read the system configuration and control data from the database 440 and use the system configuration and control data to configure and/or customize the settings of the pillbox 100.

In some embodiments, a default reminder pattern/period can be 2 hours long and can be programmable from 2 minutes to 4 hours. In some embodiments, the reminder period can be divided into 4 parts: lights and no sound (a default value of this part of the reminder period can be, for example, 30 minutes); lights and a low volume sound (a default value of this part of the reminder period can be, for example, 30 minutes); lights and a medium volume sound (a default value of this part of the reminder period can be, for example, 30 minutes); and lights and a loud volume sound (a default value of this part of the reminder period can be, for example, 30 minutes).

In some embodiments, if medications are not taken during the reminder period, a notice of non-compliance can be sent by the control system 410 to the monitoring device 430. In some embodiments, a non-compliance notification can be sent via text message, and/or email and/or recorded voice message, and/or the like. In some embodiments, the system 400 can be programmed to notify anytime medication is taken.

Figure 5:
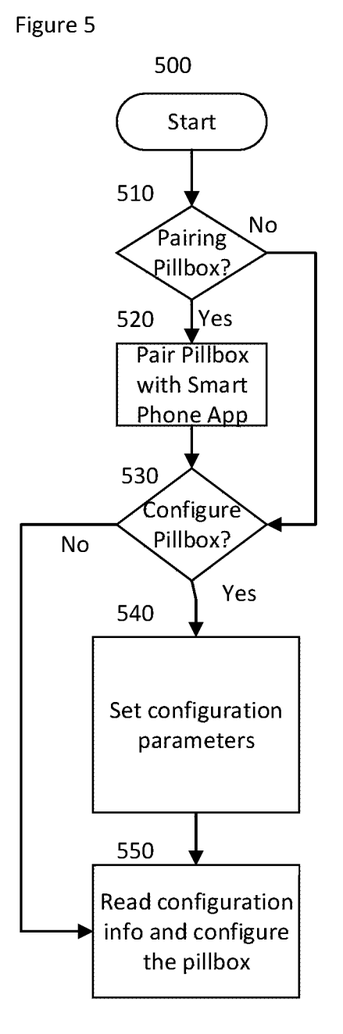
FIG. 5 is a flow chart of a method of configuring the system of monitoring compliance with medications, according to some embodiments.

FIG. 5 is a flow chart of a method of configuring the system of monitoring compliance with medications, according to some embodiments.

In some embodiments, the method of configuring the system of monitoring compliance with medications includes 510 decision on paring the pillbox 100. A user can choose either to pair or not to pair the pillbox 100. When a user choose to pair a pillbox 100, a monitoring device 430, such as a smartphone, can pair the pillbox 100 with a smartphone application by step 520, and use the application to control and configure the pillbox 100. When a user chooses not to pair a pillbox 100, the step 520 can be skipped.

In some embodiments, the method of configuring the system of monitoring compliance with medications includes 530 decision on configuring the pillbox 100. A user can choose either to configure or not to configure the pillbox 100. When a user chooses to configure a pillbox 100, a user can configure the pillbox 100 by step 540. The configuration of the pillbox includes the number of times to take medications per day, the time to take medications in one day, the reminder pattern/period, and customized sounds. The configuration of the pillbox is stored in the database 440 or the at least one memory 480 of the control system 410. When a user chooses not to configure a pillbox 100, the step 540 can be skipped. A default configuration of the pillbox is stored in the database 440 or the at least one memory 480 of the control system 410. The configuration of the pillbox can be read to configure the pillbox 100 by step 550.

In some embodiments, the method of configuring the system of monitoring compliance with medications includes storing a set of compliance or non-compliance parameters in the at least one memory of the control system; retrieving the set of compliance or non-compliance parameters, by the control system; and operating the pillbox using the set of default compliance or non-compliance parameters.

Figure 6:
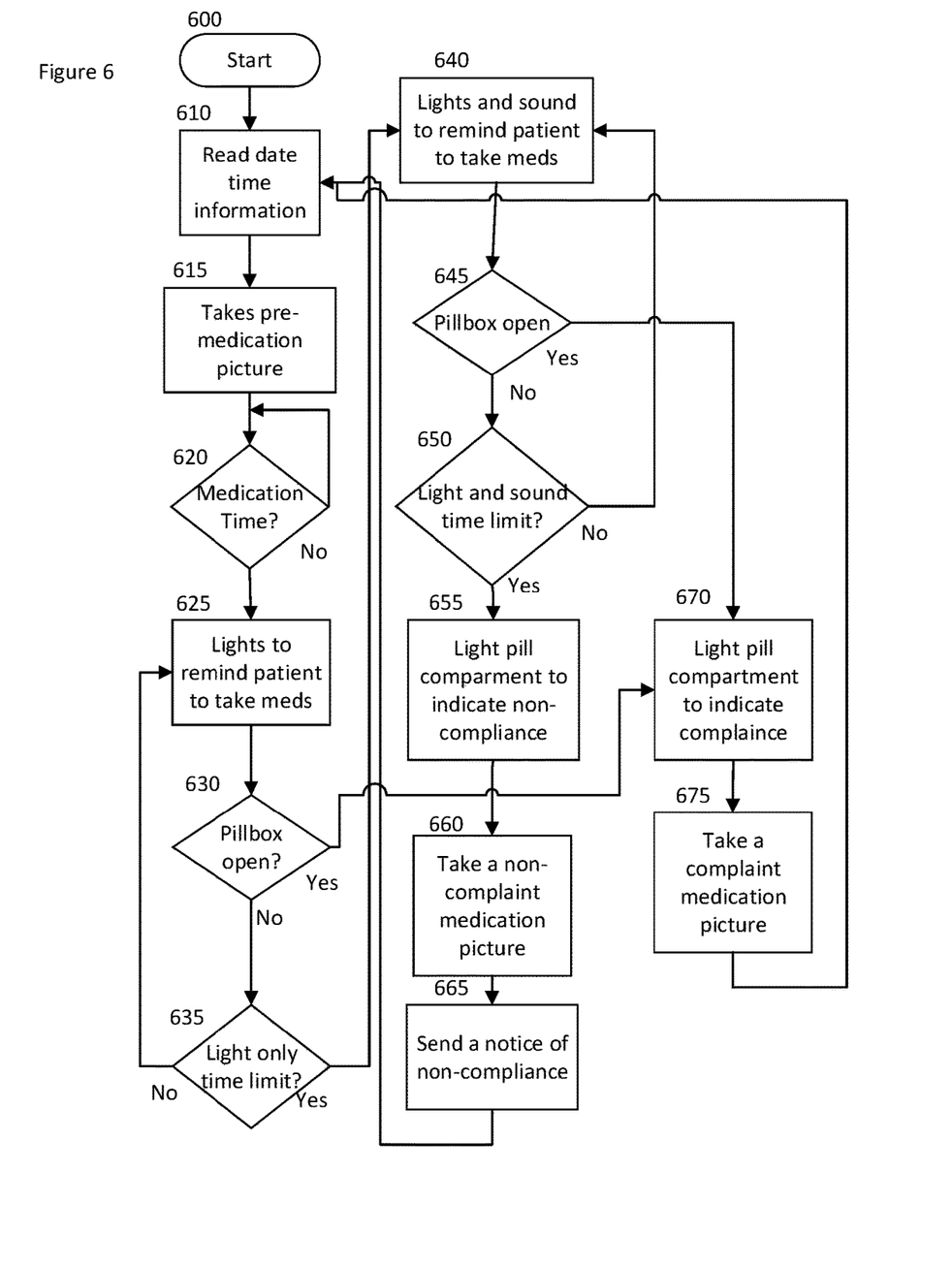
FIG. 6 is a flow chart of a method of using the system of monitoring compliance with medications, according to some embodiments.

FIG. 6 is a flow chart of a method of using the system of monitoring compliance with medications, according to some embodiments.

In some embodiments, the method of using the system of monitoring compliance with medications includes 610 retrieving a system date and a system time, by the control system; 615 taking a pre-medication picture, by the camera; 620 comparing the system date and the system time with the set of compliance or compliance parameters to get a medication timeout information. If the medication timeout is reached, which means the system date and time exceeds the configured time to take medications in one day, the light of the at least one compartment is lighted to indicate a medication reminder by step 625. The method also includes 630 determining a pillbox open (or close) status, by the control system.

In some embodiments, if the pillbox is not opened after the medication timeout is reached, the light of the at least one compartment is continuing to be lighted to indicate a medication reminder by step 625, until a light-only reminder time limit, which is determined by step 635, is reached.

In some embodiments, if the light-only reminder time limit is reached and the pillbox is not open, the sound device will emit a sound, using the pillbox open status and the set of compliance parameters, by step 640. Step 645 is similar to 630, which determines a pillbox open (or close) status, by the control system.

In some embodiments, if the pillbox is not opened after the light-only reminder time limit is reached, the sound is continuing to be emitted and the light of the at least one compartment is continuing to be lighted to indicate a medication reminder by step 640, until a light-and-sound reminder time limit, which is determined by step 650, is reached. Then the light of the at least one compartment using the pillbox open status and the set of compliance parameters to indicate a non-compliance is lighted by step 655.

In some embodiments, if at any time, before the light-and-sound reminder time limit is reached, the pillbox is opened, the method will include 670 lighting the light of the at least one compartment using the pillbox open status and the set of compliance parameters to indicate a compliance; 675 taking a compliance picture, by the camera; and storing the compliance picture in the database.

In some embodiments, when the light-and-sound reminder time limit is reached and the pillbox is not opened, the method of configuring the system of monitoring compliance with medications includes 660 taking a non-compliance picture, by the camera; storing the non-compliance picture in the database; and 665 sending a non-compliance notification, by the control system, to the monitoring device.

Figure 7:
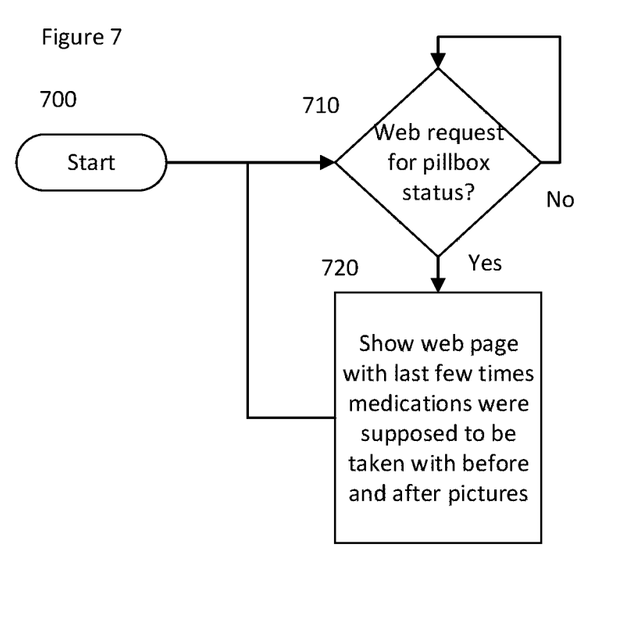
FIG. 7 is a flow chart of another method of using the system of monitoring compliance with medications, according to some embodiments.

FIG. 7 is a flow chart of another method of using the system of monitoring compliance with medications, according to some embodiments.

In some embodiments, the method of configuring the system of monitoring compliance with medications includes 710 determining a request for status, such as a web request for pillbox status, by the monitoring device 430. The method further includes retrieving a set of medication records from the database, and displaying the set of medication records, such as 720 showing webpage with records of last few times that medications were supposed to be taken, with pictures before and after the medication time, by the monitoring device.

In some embodiments, the method of configuring the system of monitoring compliance with medications also includes storing a set of compliance records and a set of non-compliance records, such as pictures and/or videos, in the database; processing and comparing the set of medication records (including pictures and/or videos) with the set of compliance records and the set of non-compliance records (including pictures and/or videos); determining a medication compliance or non-compliance status based on the comparison; and sending a notification, such as e-mail, text message, voice mail, or the like, to the monitoring device.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts, without departing from the scope of the present disclosure. The word "embodiment" as used within this specification may, but does not necessarily, refer to the same embodiment. This specification and the embodiments described are examples only. Other and further embodiments may be devised without departing from the basic scope thereof, with the true scope and spirit of the disclosure being indicated by the claims that follow.

The invention claimed is:

1. A pillbox for remotely monitoring compliance with medications, comprising:
   a lid, the lid having an inside surface, an outside surface, and a lid switch, wherein the lid is pyramid shaped;
   a housing base, the housing base having at least one row and seven columns, the housing base being divided into at least one compartment by the at least one row and the seven columns, each of the at least one compartment including a light to illuminate the at least one compartment with at least one color;
   a camera secured to the pillbox, wherein the camera is disposed at an apex of the inside surface of the lid to allow the camera to take pictures for the at least one compartment; and
   a sound device secured to the housing base,
   wherein the housing base has a top layer and a bottom layer, the lid is attached to a side of the top layer of the housing base.

2. A pillbox for remotely monitoring compliance with medications, comprising:
   a lid, the lid having an inside surface, an outside surface, and a lid switch;
   at least one mirror disposed on the inside surface of the lid;
   a housing base, the housing base having at least one row and seven columns, the housing base being divided into at least one compartment by the at least one row and the seven columns, each of the at least one compartment including a light to illuminate the at least one compartment with at least one color;
   a camera secured to the pillbox, wherein the camera is secured to the housing base and the camera points up at the at least one mirror to allow the camera to take pictures for the at least one compartment; and
   a sound device secured to the housing base,
   wherein the housing base has a top layer and a bottom layer, the lid is attached to a side of the top layer of the housing base.

3. The pillbox according to claim 1 or claim 2, wherein the housing base has four rows, the housing base is divided into twenty-eight compartments by the four rows and the seven columns.

4. The pillbox according to claim 1 or claim 2, wherein the camera is a webcam and is configured to take videos.

5. A system for monitoring compliance with medications, comprising:
   the pillbox of claim 1 or claim 2;
   a control system secured to the pillbox;
   an information transfer system; and
   a monitoring device,
   wherein the control system is in communicable connection with the camera of the pillbox, the control system is in communicable connection with the light of the at least one compartment, the control system is in communicable connection with the sound device of the pillbox, the control system is in communicable connection with the information transfer system, and the information transfer system is in communicable connection with the monitoring device.

6. The system according to claim 5, wherein the control system is located within the pillbox, the control system includes at least one input interface; at least one output interface; a controller; and at least one memory, wherein the at least one input interface is in communicable connection with the monitoring device, the at least one output interface is in communicable connection with the light of each of the at least one compartment; the lid switch, the camera, and the sound device, and the controller is in communicable connection with the at least one input interface; the at least one output interface; and the at least one memory.

7. The system according to claim 6, further comprising:
a database, the database being in communicable connection with the information transfer system, wherein the database is located within the at least one memory of the control system.

8. The system according to claim 7, wherein the monitoring device is a mobile device, and the information transfer system is Internet.

9. A method of using the system of claim 5, comprising:
pairing the pillbox with an application installed in the monitoring device;
configuring the pillbox with a set of compliance parameters, by the application;
retrieving the set of compliance parameters, by the control system; and
operating the pillbox using the set of compliance parameters.

10. The method according to claim 9, further comprising:
retrieving a system date and a system time, by the control system;
taking a pre-medication picture, by the camera;
comparing the system date and the system time with the set of compliance parameters to get a medication timeout information;
lighting the light of the at least one compartment using the medication timeout information to indicate a medication reminder; and
determining a pillbox open status, by the control system.

11. The method according to claim 10, further comprising:
emitting a sound, by the sound device, using the pillbox open status and the set of compliance parameters; and
lighting the light of the at least one compartment using the pillbox open status and the set of compliance parameters to indicate a non-compliance.

12. The method according to claim 11, further comprising:
taking a non-compliance picture, by the camera; and
storing the non-compliance picture in the database.

13. The method according to claim 12, further comprising:
sending a non-compliance notification, by the control system, to the monitoring device.

14. The method according to claim 13, wherein the non-compliance notification is a text message.

15. The method according to claim 10, further comprising:
lighting the light of the at least one compartment using the pillbox open status and the set of compliance parameters to indicate a compliance;
taking a compliance picture, by the camera; and
storing the compliance picture in the database.

16. The method according to claim 9, wherein the control system has an internal clock, the method further comprising:
retrieving a current date and a current time, by the control system;
determining a start compartment and an end compartment in the housing base using the current date and the current time; and
lighting each light from the start compartment to the end compartment, one at a time, at a predetermined interval.

17. A method of using the system of claim 5, comprising:
storing a set of compliance parameters in the at least one memory of the control system;
retrieving the set of compliance parameters, by the control system; and
operating the pillbox using the set of compliance parameters.

18. A method of using the system of claim 5, comprising:
determining a request for status, by the monitoring device;
retrieving a set of medication records from the database; and
displaying the set of medication records, by the monitoring device.

19. A method of using the system of claim 18, further comprising:
storing a set of compliance records and a set of non-compliance records in the database;
comparing the set of medication records with the set of compliance records and the set of non-compliance records;
determining a medication compliance status; and
sending a notification to the monitoring device.

* * * * *